United States Patent
Abe

(10) Patent No.: US 9,966,632 B2
(45) Date of Patent: *May 8, 2018

(54) NON-AQUEOUS ELECTROLYTE AND POWER STORAGE DEVICE USING SAME

(71) Applicant: UBE INDUSTRIES, LTD., Ube-shi (JP)

(72) Inventor: Koji Abe, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 468 days.

This patent is subject to a terminal disclaimer.

(21) Appl. No.: 14/417,670

(22) PCT Filed: Jul. 29, 2013

(86) PCT No.: PCT/JP2013/070504
§ 371 (c)(1),
(2) Date: Jan. 27, 2015

(87) PCT Pub. No.: WO2014/021272
PCT Pub. Date: Feb. 6, 2014

(65) Prior Publication Data
US 2015/0221985 A1    Aug. 6, 2015

(30) Foreign Application Priority Data

Jul. 31, 2012 (JP) ................................. 2012-169847
Jul. 31, 2012 (JP) ................................. 2012-169871
Oct. 15, 2012 (JP) ................................. 2012-227665

(51) Int. Cl.
| | | |
|---|---|---|
| H01M 10/0567 | (2010.01) | |
| H01M 10/0569 | (2010.01) | |
| H01M 10/052 | (2010.01) | |
| H01M 6/16 | (2006.01) | |
| H01G 11/64 | (2013.01) | |
| H01G 11/60 | (2013.01) | |
| H01M 10/0568 | (2010.01) | |
| H01M 10/0525 | (2010.01) | |

(52) U.S. Cl.
CPC ........ H01M 10/0567 (2013.01); H01G 11/60 (2013.01); H01G 11/64 (2013.01); H01M 6/168 (2013.01); H01M 10/052 (2013.01); H01M 10/0569 (2013.01); H01M 6/164 (2013.01); H01M 6/166 (2013.01); H01M 10/0525 (2013.01); H01M 10/0568 (2013.01); H01M 2300/0025 (2013.01); Y02E 60/13 (2013.01); Y02T 10/7011 (2013.01); Y02T 10/7022 (2013.01)

(58) Field of Classification Search
CPC ......... H01M 10/0567; H01M 10/0569; H01M 10/0568; H01M 10/0525; H01M 10/052; H01M 6/168; H01M 6/164; H01M 6/166; H01M 2300/0025; H01M 2300/0037; Y02E 60/13; H01G 11/60; H01G 11/64

See application file for complete search history.

(56) References Cited

U.S. PATENT DOCUMENTS

| | | | | |
|---|---|---|---|---|
| 9,318,776 | B2 * | 4/2016 | Abe | H01M 10/0567 |
| 9,384,906 | B2 * | 7/2016 | Abe | H01M 10/0525 |
| 2007/0243471 | A1 | 10/2007 | Takahashi | |
| 2009/0130566 | A1 | 5/2009 | Iwanaga et al. | |
| 2009/0181311 | A1 * | 7/2009 | Iwanaga | H01M 10/0567 429/331 |
| 2010/0035147 | A1 | 2/2010 | Kotato et al. | |
| 2012/0156557 | A1 | 6/2012 | Kotato et al. | |
| 2012/0264011 | A1 | 10/2012 | Kotato et al. | |
| 2012/0313570 | A1 * | 12/2012 | Ohtaniuchi | H01M 10/0567 429/200 |
| 2013/0344381 | A1 * | 12/2013 | Kawamoto | H01M 10/0567 429/200 |

FOREIGN PATENT DOCUMENTS

| | | |
|---|---|---|
| JP | 10-189039 A | 7/1998 |
| JP | 2006-66320 A | 3/2006 |
| JP | 2008-235147 A | 10/2008 |
| JP | 2008-262908 A | 10/2008 |
| JP | 2008-277086 A | 11/2008 |

(Continued)

OTHER PUBLICATIONS

Extended European Search Report dated Feb. 16, 2016 in Patent Application No. 13825021.2.
International Search Report dated Oct. 22, 2013 in PCT/JP2013/070504 filed Jul. 29, 2013.

*Primary Examiner* — Laura Weiner
(74) *Attorney, Agent, or Firm* — Oblon, McClelland, Maier & Neustadt, L.L.P.

(57) ABSTRACT

Provided are a nonaqueous electrolytic solution having an electrolyte salt dissolved in a nonaqueous solvent, the non-aqueous electrolytic solution containing from 0.001 to 5% by mass of 1,3-dioxane and further containing from 0.001 to 5% by mass of at least one selected from a specified phosphoric acid ester compound, a specified cyclic sulfonic acid ester compound, and a cyclic acid anhydride containing a side chain having allyl hydrogen; and an energy storage device using the same. This nonaqueous electrolytic solution is capable of improving electrochemical characteristics at high temperatures and further capable of not only improving a capacity retention rate after a high-temperature cycle test but also decreasing a rate of increase of an electrode thickness.

10 Claims, No Drawings

(56) References Cited

FOREIGN PATENT DOCUMENTS

| | | |
|---|---|---|
| JP | 2009-70615 A | 4/2009 |
| JP | 2009-140919 A | 6/2009 |
| JP | 2010-165549 A | 7/2010 |
| JP | 2011-60464 A | 3/2011 |
| WO | WO 2012/141270 | * 10/2012 |

* cited by examiner

NON-AQUEOUS ELECTROLYTE AND POWER STORAGE DEVICE USING SAME

TECHNICAL FIELD

The present invention relates to a nonaqueous electrolytic solution capable of improving electrochemical characteristics at high temperatures and also an energy storage device using the same.

BACKGROUND ART

An energy storage device, especially a lithium secondary battery, has been widely used recently for a power source of an electronic device, such as a mobile telephone, a notebook personal computer, etc., and a power source for an electric vehicle and an electric power storage. There is a high possibility that the battery mounted on such an electronic device or vehicle is used at midsummer high temperatures or under an environment warmed by generation of heat of the electronic device.

In a thin electronic device, such as a tablet device, an ultrabook, etc., a laminate-type battery or a prismatic battery using a laminate film, such as a an aluminum laminate film, etc., for an exterior member is frequently used; however, since such a battery is thin, a problem that the battery is easily deformed due to expansion of the exterior member or the like is easily caused, and the matter that the deformation very likely influences the electronic device is problematic.

A lithium secondary battery is mainly constituted of a positive electrode and a negative electrode, each containing a material capable of absorbing and releasing lithium, and a nonaqueous electrolytic solution containing a lithium salt and a nonaqueous solvent; and a carbonate, such as ethylene carbonate (EC), propylene carbonate (PC), etc., is used as the nonaqueous solvent.

A lithium metal, a metal compound capable of absorbing and releasing lithium (e.g., a metal elemental substance, a metal oxide, an alloy with lithium, etc.), and a carbon material are known as the negative electrode of the lithium secondary battery. In particular, a nonaqueous electrolytic solution secondary battery using, as the carbon material, a carbon material capable of absorbing and releasing lithium, for example, coke or graphite (e.g, artificial graphite or natural graphite), etc., is widely put into practical use.

Since the aforementioned negative electrode material stores/releases lithium and an electron at an extremely electronegative potential equal to the lithium metal, it has a possibility that a lot of solvents are subjected to reductive decomposition especially at high temperatures, and a part of the solvent in the electrolytic solution is reductively decomposed on the negative electrode regardless of the kind of the negative electrode material, so that there were involved such problems that the movement of a lithium ion is disturbed due to deposition of decomposition products, generation of a gas, or expansion of the electrode, thereby worsening battery characteristics, such as cycle property, especially at high temperatures, etc.; and that the battery is deformed due to expansion of the electrode.

Furthermore, it is known that a lithium secondary battery using a lithium metal or an alloy thereof, or a metal elemental substance, such as tin, silicon, etc., or a metal oxide thereof as the negative electrode material may have a high initial battery capacity, but the battery capacity and the battery performance thereof, such as the cycle property, may be largely worsened especially at high temperatures since the micronized powdering of the material may be promoted during cycles, which brings about accelerated reductive decomposition of the nonaqueous solvent, as compared with the negative electrode formed of a carbon material, and the battery may be deformed due to expansion of the electrode.

Meanwhile, since a material capable of absorbing and releasing lithium, which is used as a positive electrode material, such as $LiCoO_2$, $LiMn_2O_4$, $LiNiO_2$, $LiFePO_4$, etc., stores and releases lithium and an electron at an electropositive voltage of 3.5 V or more on the lithium basis, it has a possibility that a lot of solvents are subjected to oxidative decomposition especially at high temperatures, and a part of the solvent in the electrolytic solution is oxidatively decomposed on the positive electrode regardless of the kind of the positive electrode material, so that there were involved such problems that the movement of a lithium ion is disturbed due to deposition of decomposition products or generation of a gas, thereby worsening battery characteristics, such as cycle property, etc.

Irrespective of the situation, the multifunctionality of electronic devices on which lithium secondary batteries are mounted is more and more advanced, and power consumption tends to increase.

The capacity of lithium secondary battery is thus being much increased, and the space volume for the nonaqueous electrolytic solution in the battery is decreased by increasing the density of the electrode, or reducing the useless space volume in the battery, or the like. In consequence, it is a situation that the battery performance at high temperatures is easily worsened due to even a bit of decomposition of the nonaqueous electrolytic solution.

PTL 1 describes that in the case of storing a nonaqueous electrolyte secondary battery using an electrolytic solution containing 1,3-dioxane in a charged state, not only this positive electrode active material and the nonaqueous electrolytic solution react with each other, thereby preventing expansion of the battery from occurring, but also worsening of the battery capacity of this nonaqueous electrolyte secondary battery is suppressed; and PTL 2 describes that an electrolytic solution containing triethyl phosphonoacetate exhibits effects in gas emission control after continuous charge and high-temperature storage property.

PTL 3 describes that an electrolytic solution containing 1,3-dioxane and a linear sulfonic acid ester exhibits effects in cycle property and high-temperature storage property.

PTL 1: JP-A 2008-235147
PTL 2: JP-A 2008-262908
PTL 3: JP-A 2009-140919

SUMMARY OF INVENTION

Technical Problem

Problems to be solved by the present invention are to provide a nonaqueous electrolytic solution capable of improving electrochemical characteristics at high temperatures and further capable of not only improving a capacity retention rate after a high-temperature cycle test but also decreasing a rate of increase of an electrode thickness, and also to provide an energy storage device using the same.

Solution to Problem

The present inventor made extensive and intensive investigations regarding the performances of the nonaqueous electrolytic solutions of the above-cited patent literatures.

As a result, as for the battery of PTL 1, though the expansion of the battery can be prevented by suppression of the generation of a gas, it may not be said that the problem to decrease a rate of increase of an electrode thickness is thoroughly satisfactory.

As for the nonaqueous electrolytic solutions of PTLs 2 and 3, though the capacity retention rate after high-temperature cycles can be improved, it is the actual situation that it may not be said that the problem to decrease a rate of increase of an electrode thickness is thoroughly satisfactory.

Then, in order to solve the aforementioned problems, the present inventor made extensive and intensive investigations; and as a result, it has been found that by using a nonaqueous electrolytic solution containing 1,3-dioxane and further adding thereto at least one selected from a specified phosphoric acid ester compound, a cyclic sulfonic acid ester compound, and a cyclic acid anhydride containing a side chain having allyl hydrogen, not only the capacity retention rate after high-temperature cycles can be improved, but also the rate of increase of an electrode thickness can be decreased, leading accomplishment of the present invention.

Specifically, the present invention provides the following (1) and (2).

(1) A nonaqueous electrolytic solution having an electrolyte salt dissolved in a nonaqueous solvent, the nonaqueous electrolytic solution comprising from 0.001 to 5% by mass of 1,3-dioxane and further comprising from 0.001 to 5% by mass of at least one selected from a phosphoric acid ester compound represented by the following general formula (I), a cyclic sulfonic acid ester compound represented by the following general formula (II), and a cyclic acid anhydride containing a side chain having allyl hydrogen.

[Chem. 1]

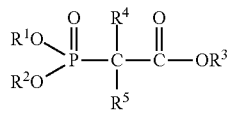

(I)

(wherein each of $R^1$ and $R^2$ independently represents an alkyl group having from 1 to 6 carbon atoms or a halogenated alkyl group having from 1 to 6 carbon atoms, in which at least one hydrogen atom is substituted with a halogen atom; $R^3$ represents an alkyl group having from 1 to 6 carbon atoms, an alkenyl group having from 2 to 6 carbon atoms, or an alkynyl group having from 3 to 6 carbon atoms; and each of $R^4$ and $R^5$ independently represents a hydrogen atom, a halogen atom, or an alkyl group having from 1 to 4 carbon atoms.)

[Chem. 2]

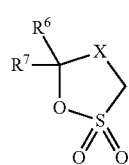

(II)

(wherein each of $R^6$ and $R^7$ independently represents a hydrogen atom, an alkyl group having from 1 to 6 carbon atoms, in which at least one hydrogen atom may be substituted with a halogen atom, or a halogen atom; X represents —CH($OR^8$)— or —C(=O)—; and $R^8$ represents a formyl group, an alkyl carbonyl group having from 2 to 7 carbon atoms, an alkenyl carbonyl group having from 3 to 7 carbon atoms, an alkynyl carbonyl group having from 3 to 7 carbon atoms, or an aryl carbonyl group having from 7 to 13 carbon atoms. At least one hydrogen atom in $R^8$ may be substituted with a halogen atom.)

(2) An energy storage device comprising a positive electrode, a negative electrode, and a nonaqueous electrolytic solution having an electrolyte salt dissolved in a nonaqueous solvent, wherein the nonaqueous electrolytic solution comprises from 0.001 to 5% by mass of 1,3-dioxane and further comprises from 0.001 to 5% by mass of at least one selected from a phosphoric acid ester compound represented by the foregoing general formula (I), a cyclic sulfonic acid ester compound represented by the foregoing general formula (II), and a cyclic acid anhydride containing a side chain having allyl hydrogen.

Advantageous Effects of Invention

According to the present invention, it is possible to provide a nonaqueous electrolytic solution capable of not only improving the capacity retention rate after high-temperature cycles but also decreasing the rate of increase of an electrode thickness and an energy storage device using the same, such as a lithium battery, etc.

DESCRIPTION OF EMBODIMENTS

[Nonaqueous Electrolytic Solution]

The nonaqueous electrolytic solution of the present invention is concerned with a nonaqueous electrolytic solution having an electrolyte salt dissolved in a nonaqueous solvent, the nonaqueous electrolytic solution comprising from 0.001 to 5% by mass of 1,3-dioxane and further comprising from 0.001 to 5% by mass of at least one selected from a phosphoric acid ester compound represented by the general formula (I), acyclic sulfonic acid ester compound represented by the general formula (II), and a cyclic acid anhydride containing a side chain having allyl hydrogen.

Although the reason why the nonaqueous electrolytic solution of the present invention is capable of significantly improving electrochemical characteristics in a broad temperature range has not been elucidated yet, the following may be considered.

The 1,3-dioxane which is used in the present invention is decomposed on the negative electrode to form a surface film; however, in the case of sole use, when charge/discharge is repeated under a high-temperature condition, the surface film grows due to dissolution and reformation of the surface film, whereby the thickness of the electrode largely increases.

Meanwhile, when used in combination with at least one selected from a phosphoric acid ester compound represented by the general formula (I), a cyclic sulfonic acid ester compound represented by the general formula (II), and a cyclic acid anhydride containing a side chain having allyl hydrogen, it has become clear that not only the decomposition of 1,3-dioxane on the negative electrode is suppressed, but also a firm composite surface film made of the aforementioned compound and having plural reaction sites with 1,3-dioxane is quickly formed on an active point on the negative electrode, whereby not only high-temperature cyclic characteristics are improved, but also the growth of the surface film is suppressed and the increase of the electrode thickness may be much more suppressed.

In the nonaqueous electrolytic solution of the present invention, a content of the 1,3-dioxane is from 0.001 to 5% by mass in the nonaqueous electrolytic solution. When the content is 5% by mass or less, there is less concern that a surface film is excessively formed on the electrode, thereby causing worsening of high-temperature cycle characteristics, and when it is 0.001% by mass or more, a surface film is sufficiently formed, thereby increasing an effect for improving high-temperature cycle characteristics. The content is preferably 0.01% by mass or more, and more preferably 0.1% by mass or more in the nonaqueous electrolytic solution. An upper limit thereof is preferably 4% by mass or less, and more preferably 2% by mass or less.

The phosphoric acid ester compound which is contained in the nonaqueous electrolytic solution of the present invention is represented by the following general formula (I).

[Chem. 3]

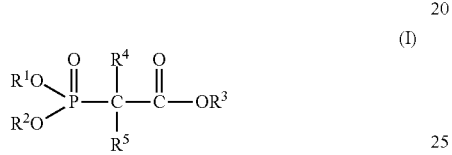

(I)

(In the formula, each of $R^1$ and $R^2$ independently represents an alkyl group having from 1 to 6 carbon atoms or a halogenated alkyl group having from 1 to 6 carbon atoms, in which at least one hydrogen atom is substituted with a halogen atom; $R^3$ represents an alkyl group having from 1 to 6 carbon atoms, an alkenyl group having from 2 to 6 carbon atoms, or an alkynyl group having from 3 to 6 carbon atoms; and each of $R^4$ and $R^5$ independently represents a hydrogen atom, a halogen atom, or an alkyl group having from 1 to 4 carbon atoms.)

Specific examples of $R^1$ and $R^2$ include linear alkyl groups, such as a methyl group, an ethyl group, an n-propyl group, an n-butyl group, an n-pentyl group, an n-hexyl group, etc.; branched alkyl groups, such as an isopropyl group, a sec-butyl group, a tert-butyl group, a tert-amyl group, etc.; and fluorinated alkyl groups in which a part of hydrogen atoms is substituted with a fluorine atom, such as a fluoromethyl group, a 2,2,2-trifluoroethyl group, etc.

Of those, a methyl group, an ethyl group, an n-propyl group, an isopropyl group, or a 2,2,2-trifluoroethyl group is preferred, with a methyl group or an ethyl group being more preferred.

Specific examples of $R^3$ include linear alkyl groups, such as a methyl group, an ethyl group, an n-propyl group, an n-butyl group, an n-pentyl group, an n-hexyl group, etc.; branched alkyl groups, such as an isopropyl group, a sec-butyl group, a tert-butyl group, a tert-amyl group, etc.; alkenyl groups, such as a 2-propenyl group, a 2-butenyl group, a 3-butenyl group, a 4-pentenyl group, a 5-hexenyl group, a 2-methyl-2-propenyl group, a 3-methyl-2-butenyl group, etc.; and alkynyl groups, such as a 2-propynyl group, a 2-butynyl group, a 3-butynyl group, a 4-pentynyl group, a 5-hexynyl group, a 1-methyl-2-propynyl group, a 1,1-dimethyl-2-propynyl group, etc.

Of those, a methyl group, an ethyl group, an n-propyl group, an isopropyl group, a 2-propenyl group, a 2-butenyl group, a 2-propynyl group, a 2-butynyl group, or a 1-methyl-2-propynyl group is preferred, with a methyl group, an ethyl group, a 2-propenyl group, a2-propynyl group, or a 1-methyl-2-propynyl group being more preferred.

As specific examples of $R^4$ and $R^5$, there are suitably exemplified a hydrogen atom, a fluorine atom, a chlorine atom, linear alkyl groups, such as a methyl group, an ethyl group, an n-propyl group, an n-butyl group, etc., and branched alkyl groups, such as an isopropyl group, a sec-butyl group, a tert-butyl group, etc.

Of those, a hydrogen atom, a fluorine atom, a methyl group, an ethyl group, an n-propyl group, or an isopropyl group is preferred, with a hydrogen atom, a fluorine atom, a methyl group, or an ethyl group being more preferred.

Examples of the phosphoric acid ester compound represented by the general formula (I) include the following compounds.

[Chem. 4]

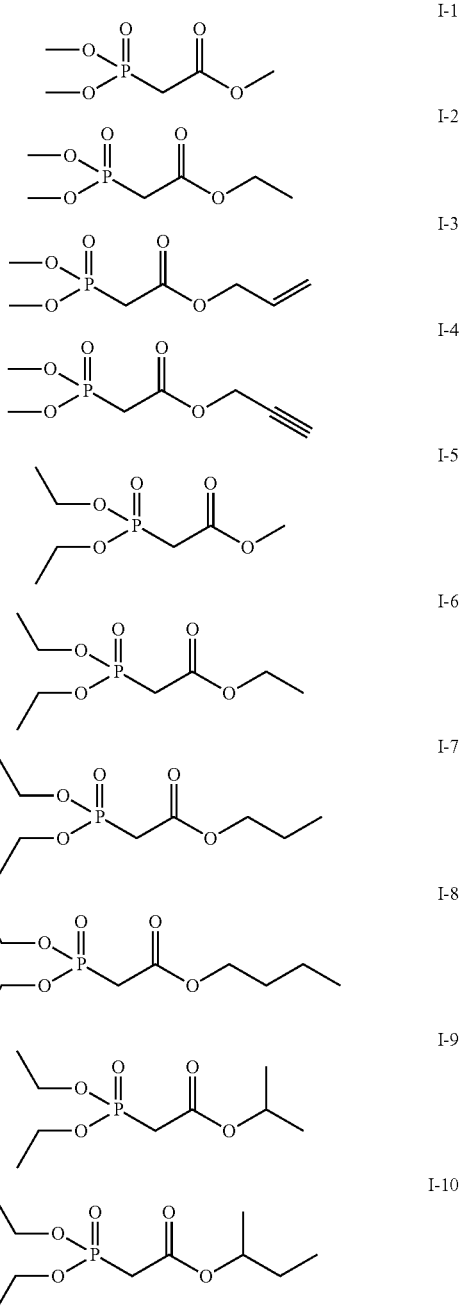

-continued
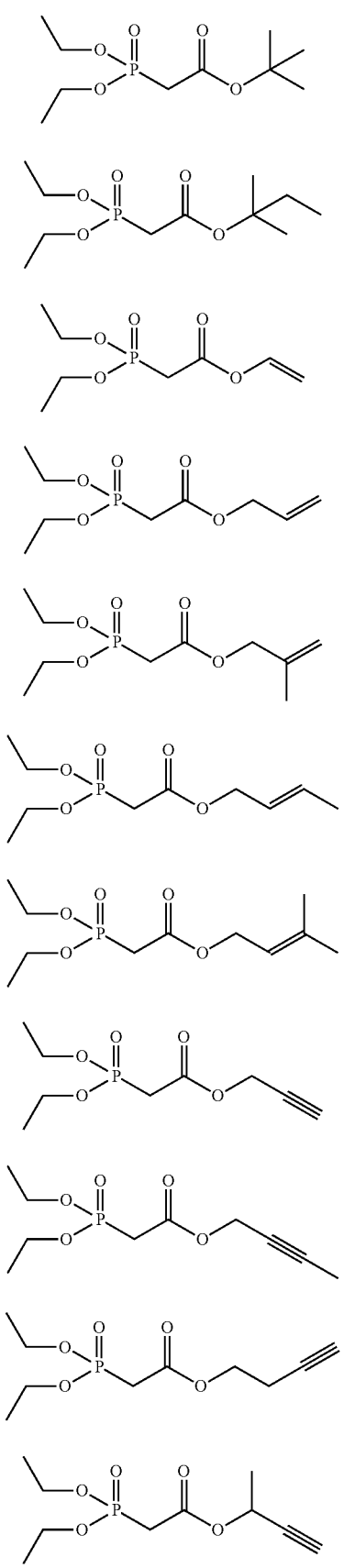
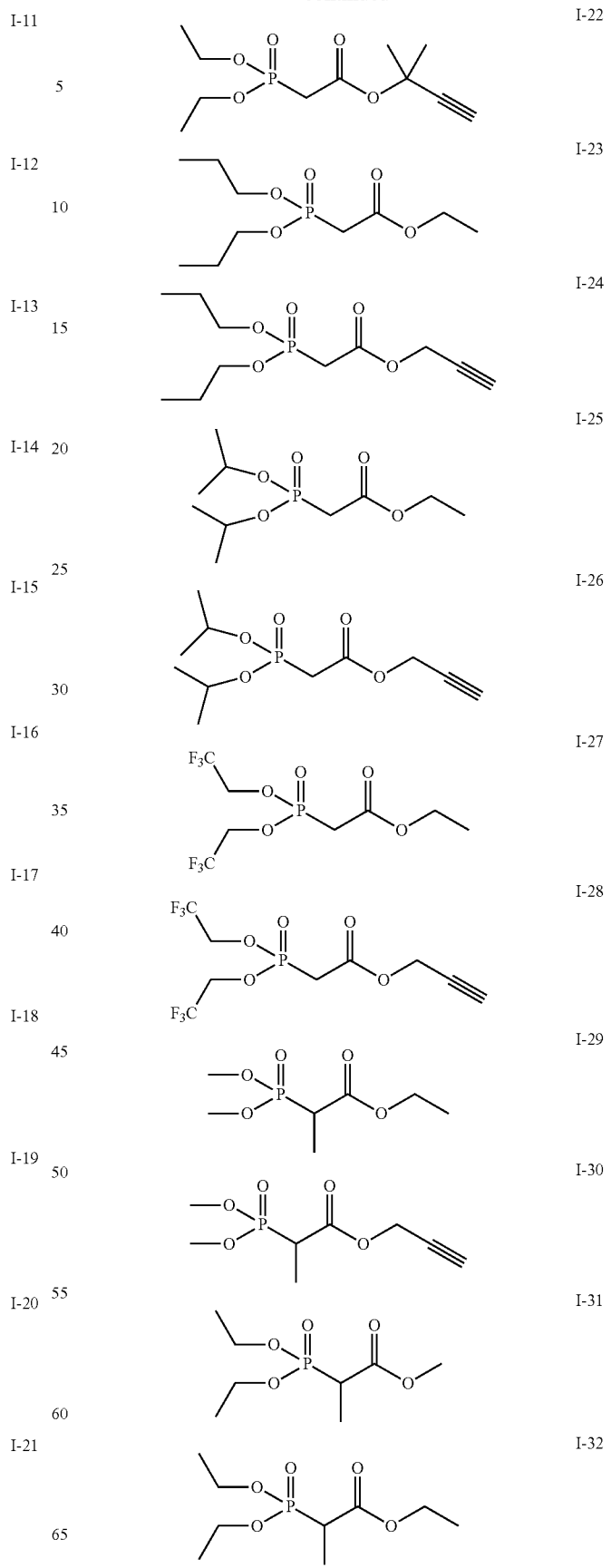

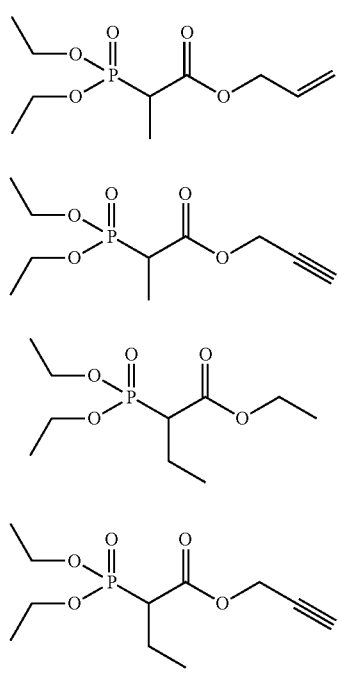
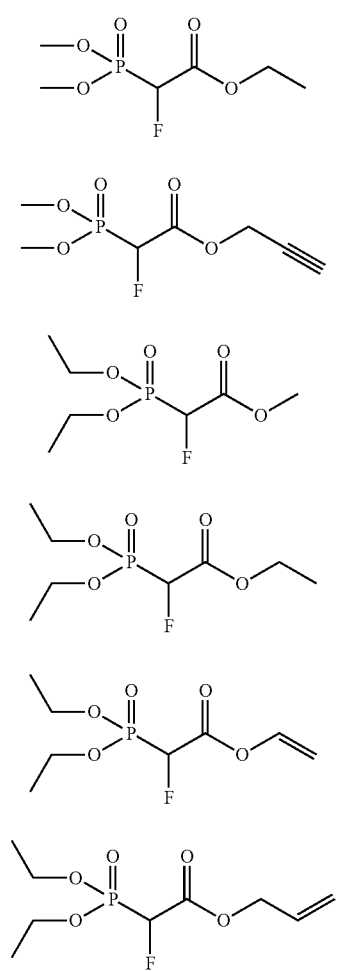
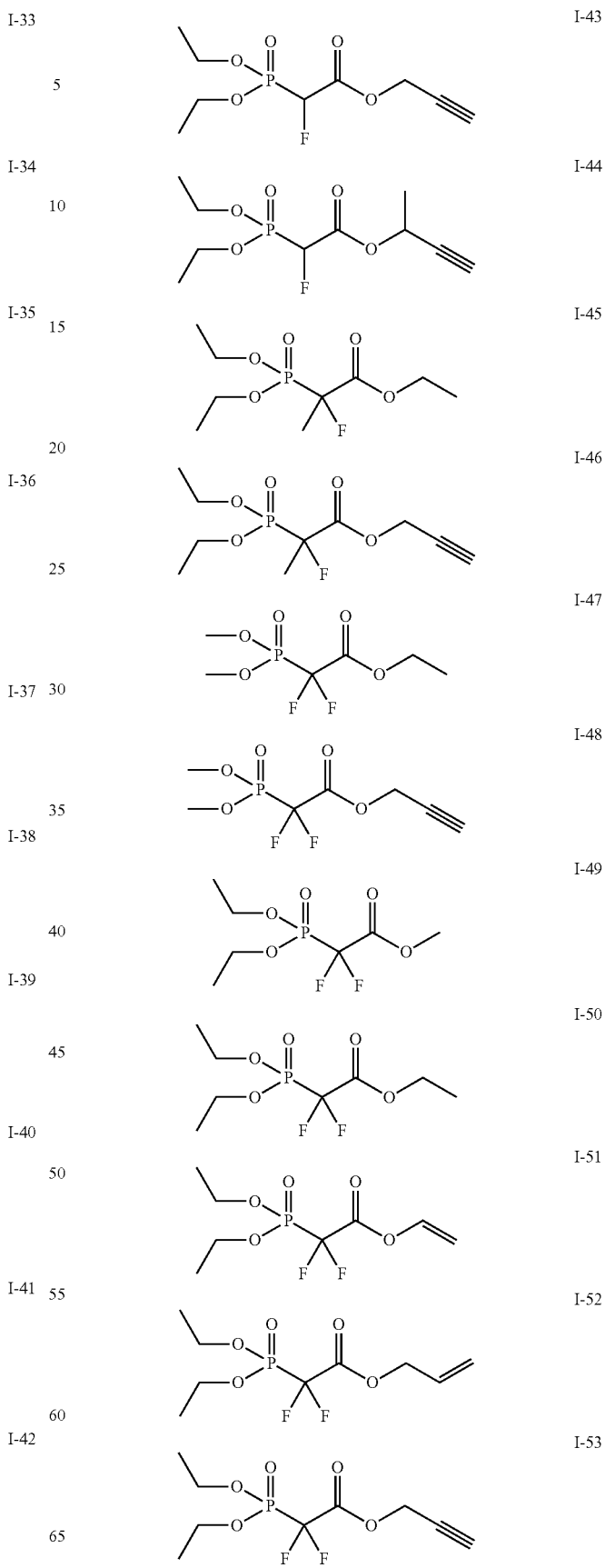

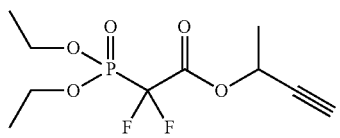 [SMILES: C#CCOC(=O)C(F)(F)P(=O)(OCC)OCC]

I-54

Of those, compounds having the foregoing structures of I-2, I-4 to I-6, I-14, I-18, I-21 to I-40, I-42 to I-50, and I-52 to I-54 are preferred; and ethyl 2-(dimethoxyphosphoryl)acetate (Compound I-2), 2-propynyl 2-(dimethoxyphosphoryl)acetate (Compound I-4), methyl 2-(diethoxyphosphoryl)acetate (compound I-5), ethyl 2-(diethoxyphosphoryl)acetate (Compound I-6), 2-propenyl 2-(diethoxyphosphoryl)acetate (Compound I-14), 2-propynyl 2-(diethoxyphosphoryl)acetate (Compound I-18), 1-methyl-2-propynyl 2-(diethoxyphosphoryl)acetate (compound I-21), 2-propynyl 2-(dimethoxyphosphoryl)propanoate (Compound I-30), 2-propynyl 2-(dimethoxyphosphoryl)propanoate (Compound I-34), ethyl 2-(dimethoxyphosphoryl)-2-fluoroacetate (Compound I-37), methyl 2-(diethoxyphosphoryl)-2-fluoroacetate (Compound I-39), ethyl 2-(diethoxyphosphoryl)-2-fluoroacetate (Compound I-40), 2-propenyl 2-(diethoxyphosphoryl)-2-fluoroacetate (Compound I-42), 2-propynyl 2-(diethoxyphosphoryl)-2-fluoroacetate (Compound I-43), 1-methyl-2-propynyl 2-(diethoxyphosphoryl)-2-fluoroacetate (Compound I-44), ethyl 2-(dimethoxyphosphoryl)-2,2-difluoroacetate (Compound 1-47), methyl 2-(diethoxyphosphoryl)-2,2-difluoroacetate (Compound I-49), ethyl 2-(diethoxyphosphoryl)-2,2-difluoroacetate (Compound I-50), 2-propenyl 2-(diethoxyphosphoryl)-2,2-difluoroacetate (Compound I-52), 2-propynyl 2-(diethoxyphosphoryl)-2,2-difluoroacetate (Compound I-53), or 1-methyl-2-propynyl 2-(diethoxyphosphoryl)-2,2-difluoroacetate (I-54) is more preferred.

The cyclic sulfonic acid ester compound which is contained in the nonaqueous electrolytic solution of the present invention is represented by the following general formula (II).

[Chem. 6]

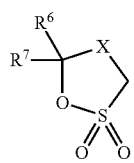

(II)

(In the formula, each of $R^6$ and $R^7$ independently represents a hydrogen atom, an alkyl group having from 1 to 6 carbon atoms, in which at least one hydrogen atom may be substituted with a halogen atom, or a halogen atom; X represents —CH(OR$^8$)— or —C(=O)—; and $R^8$ represents a formyl group, an alkyl carbonyl group having from 2 to 7 carbon atoms, an alkenyl carbonyl group having from 3 to 7 carbon atoms, an alkynyl carbonyl group having from 3 to 7 carbon atoms, or an aryl carbonyl group having from 7 to 13 carbon atoms. At least one hydrogen atom in $R^8$ may be substituted with a halogen atom.)

$R^6$ and $R^7$ are more preferably a hydrogen atom, an alkyl group having from 1 to 4 carbon atoms, in which at least one hydrogen atom may be substituted with a halogen atom, or a halogen atom; and still more preferably a hydrogen atom or an alkyl group having 1 or 2 carbon atoms, in which at least one hydrogen atom may be substituted with a halogen atom.

$R^8$ is preferably a formyl group, an alkyl carbonyl group having from 2 to 7 carbon atoms, or an alkenyl carbonyl group having from 3 to 5 carbon atoms, and more preferably a formyl group or an alkyl carbonyl group having from 2 to 5 carbon atoms.

Examples of the cyclic sulfonic acid ester compound represented by the general formula (II) include the following compounds.

[Chem. 7]

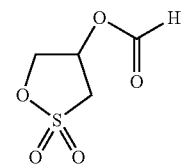
II-1

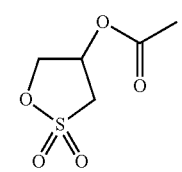
II-2

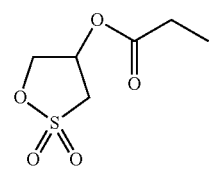
II-3

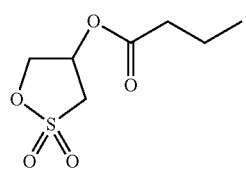
II-4

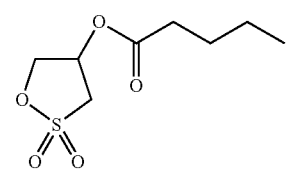
II-5

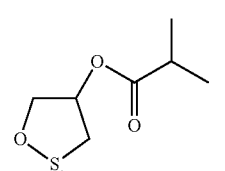
II-6

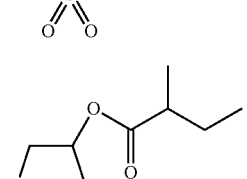
II-7

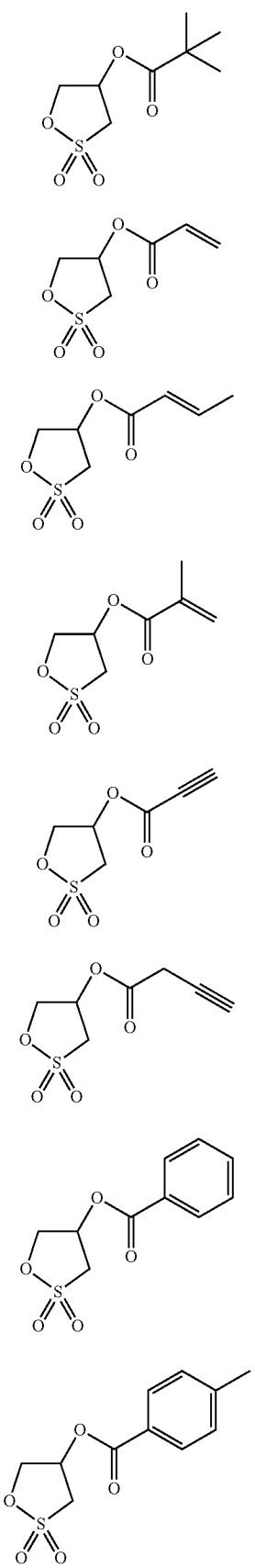
II-8
II-9
II-10
II-11
II-12
II-13
II-14
II-15
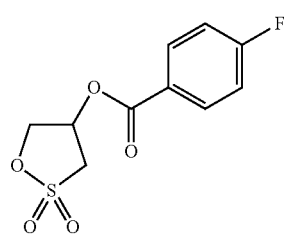
II-16
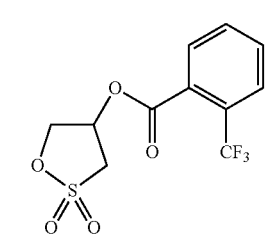
II-17
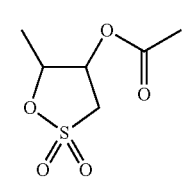
II-18
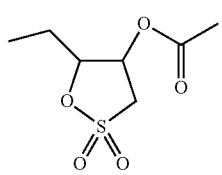
II-19
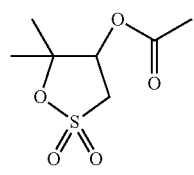
II-20
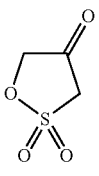
II-21
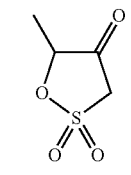
II-22
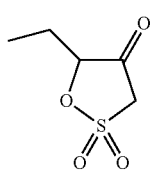
II-23

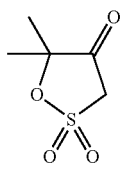

II-24

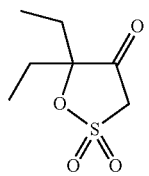

II-25

Of those, compounds having the foregoing structures of II-1 to II-3, II-6, II-8, II-9, II-11, II-22, II-24, and II-25 are preferred; and 2,2-dioxide-1,2-oxathiolane-4-yl acetate (Compound II-2), 2,2-dioxide-1,2-dioxathiolane-4-yl propionate (Compound II-3), 5-methyl-1,2-oxathiolane-4-one 2,2-dioxide (Compound II-22), or 5,5-dimethyl-1,2-oxathiolane-4-one 2,2-dioxide (Compound II-24) is more preferred.

The cyclic acid anhydride containing a side chain having allyl hydrogen, which is contained in the nonaqueous electrolytic solution of the present invention, contains a cyclic acid anhydride main body and a side chain having allyl hydrogen bonded thereto.

The cyclic acid anhydride main body is preferably a cyclic acid anhydride having from 4 to 5 carbon atoms, and preferably succinic anhydride.

The side chain having allyl hydrogen is preferably a linear or branched hydrocarbon group having preferably from 3 to 12 carbon atoms, and more preferably from 3 to 10 carbon atoms.

Here, for example, in the case of an allyl group represented by $CH_2=CH-CH_2-$, the "allyl hydrogen" means two hydrogens bonded to the allyl carbon adjacent to the double bond, and it is meant by the term, "having allyl hydrogen", that the side chain has at least one of these two hydrogens. In the compound of the present invention, the number of ally hydrogen is preferably from 1 to 4, more preferably 1 or 2, and still more preferably 2.

In the cyclic acid anhydride containing a side chain having allyl hydrogen as described above, it is preferred that the allyl carbon is present between the double bond and the cyclic acid anhydride, and it is more preferred that the allyl carbon is bonded directly to both the double bond and the cyclic acid anhydride.

The number of hydrogen atoms bonded directly to the double bond of the side chain is preferably 2 or 3, and more preferably 3, namely a terminal double bond. This is because in view of the fact that allyl hydrogen and a terminal double bond are contained, when used in combination with 1,3-dioxane, a firm composite surface film is formed quickly.

The side chain having allyl hydrogen may be cyclic, linear, or branched, and it may also be substituted with a group, such as an alkyl group, an aryl group, or a group containing a hetero atom, etc.

As specific examples of the side chain having allyl hydrogen, there are suitably exemplified an allyl group, a 3-buten-2-yl group, a 1-penten-3-yl group, a 1-hexen-3-yl group, a 1-hepten-3-yl group, a 1-octen-3-yl group, a 1-nonen-3-yl group, a 2-buten-1-yl group, a 3-methyl-2-buten-1-yl group, a 2,3-dimethyl-2-buten-1-yl group, a 4-methyl-1-penten-3-yl group, a 4-methyl-1-hexen-3-yl group, a 4,4-dimethyl-1-penten-3-yl group, a 3-buten-1-yl group, a 3-penten-2-yl group, a 4-penten-1-yl group, a 5-hexen-2-yl group, a 2-methylallyl group, a 2-methyl-1-penten-3-yl group, a 2,4-dimethyl-1-penten-3-yl group, a 2,3-dimethyl-3-buten-2-yl group, a 3-methyl-3-buten-1-yl group, and a 4-methyl-4-penten-2-yl group.

Of those, an allyl group, a 1-penten-3-yl group, a 1-hexen-3-yl group, a 1-hepten-3-yl group, a 1-octen-3-yl group, a 1-nonen-3-yl group, a 3-buten-2-yl group, a 2-methylallyl group, or a 3-methyl-3-buten-2-yl group is preferred, with an allyl group, a 3-buten-2-yl group, a 2-methylallyl group, or a 3-methyl-3-buten-2-yl group being more preferred.

As specific examples of the aforementioned cyclic acid anhydride, there are suitably exemplified 2-allylsuccinic anhydride, 2-(3-buten-2-yl)succinic anhydride, 2-(1-penten-3-yl)succinic anhydride, 2-(1-hexen-3-yl)succinic anhydride, 2-(1-hepten-3-yl)succinic anhydride, 2-(1-octen-3-yl) succinic anhydride, 2-(1-nonen-3-yl)succinic anhydride, 2-(2-buten-1-yl)succinic anhydride, 2-(3-methyl-2-buten-1-yl)succinic anhydride, 2-(2,3-dimethyl-2-buten-1-yl)succinic anhydride, 2-(4-methyl-1-penten-3-yl)succinic anhydride, 2-(4-methyl-1-hexen-3-yl)succinic anhydride, 2-(4,4-dimethyl-1-penten-3-yl)succinic anhydride, 2-(3-buten-1-yl)succinic anhydride, 2-(3-penten-2-yl)succinic anhydride, 2-(4-penten-1-yl)succinic anhydride, 2-(5-hexen-2-yl)succinic anhydride, 2-(2-methylallyl)succinic anhydride, 2-(2-methyl-1-penten-3-yl)succinic anhydride, 2-(2,4-dimethyl-1-penten-3-yl)succinic anhydride, 2-(2,3-dimethyl-3-buten-2-yl)succinic anhydride, 2-(3-methyl-3-buten-1-yl)succinic anhydride, and 2-(4-methyl-4-penten-2-yl)succinic anhydride.

Of those, at least one selected from 2-allylsuccinic anhydride, 2-(1-penten-3-yl)succinic anhydride, 2-(1-hexen-3-yl)succinic anhydride, 2-(1-hepten-3-yl)succinic anhydride, 2-(1-octen-3-yl)succinic anhydride, 2-(1-nonen-3-yl)succinic anhydride, 2-(3-butene-2-yl)succinic anhydride, 2-(2-methylallyl)succinic anhydride, and 2-(3-methyl-3-buten-2-yl)succinic anhydride is more preferred; and at least one selected from 2-allylsuccinic anhydride, 2-(3-buten-2-yl) succinic anhydride, 2-(2-methylallyl)succinic anhydride, and 2-(3-methyl-3-buten-2-yl)succinic anhydride is still more preferred.

In the nonaqueous electrolytic solution of the present invention, a content of at least one selected from the phosphoric acid ester compound represented by the general formula (I), the cyclic sulfonic acid ester compound represented by the general formula (II), and the cyclic acid anhydride containing a side chain having allyl hydrogen, which is to be contained in the nonaqueous electrolytic solution, is from 0.001 to 5% by mass in the nonaqueous electrolytic solution. When the content is 5% by mass or less, there is less concern that a surface film is excessively formed on the electrode, thereby causing worsening of high-temperature cycle property, and when it is 0.001% by mass or more, a surface film is sufficiently formed, thereby increasing an effect for improving high-temperature cycle property.

The content is preferably 0.01% by mass or more, and more preferably 0.1% by mass or more in the nonaqueous electrolytic solution, and an upper limit thereof is preferably 4% by mass or less, and more preferably 2% by mass or less.

A mixing ratio (weight ratio) of the cyclic acid anhydride containing a side chain having allyl hydrogen to the 1,3-dioxane is preferably from 2/98 to 80/20, more preferably from 5/95 to 40/60, and still more preferably from 10/90 to 30/70.

Furthermore, it is more preferred to use two or more selected from the phosphoric acid ester compound represented by the general formula (I), the cyclic sulfonic acid ester compound represented by the general formula (II), and the cyclic acid anhydride containing a side chain having allyl hydrogen in combination.

In the nonaqueous electrolytic solution of the present invention, by combining at least one selected from the phosphoric acid ester compound represented by the general formula (I), the cyclic sulfonic acid ester compound represented by the general formula (II) and the cyclic acid anhydride containing a side chain having allyl hydrogen, and 1,3-dioxane with a nonaqueous solvent and an electrolyte salt as described below, a peculiar effect such that not only the capacity retention rate after high-temperature cycles may be improved, but also the rate of increase of an electrode thickness may be decreased is revealed.

[Nonaqueous Solvent]

As the nonaqueous solvent which is used for the nonaqueous electrolytic solution of the present invention, one or more selected from cyclic carbonates, linear esters, ethers, amides, sulfones, and lactones are exemplified; and it is preferred to contain at least one cyclic carbonate, and it is more preferred to contain both a cyclic carbonate and a linear ester.

The term, linear ester, is used as a concept including a linear carbonate and a linear carboxylic acid ester.

As the cyclic carbonate, one or more selected from ethylene carbonate (EC), propylene carbonate (PC), 1,2-butylene carbonate, 2,3-butylene carbonate, 4-fluoro-1,3-dioxolan-2-one (FEC), trans- or cis-4,5-difluoro-1,3-dioxolan-2-one (the both will be hereunder named generically as "DFEC"), vinylene carbonate (VC), vinyl ethylene carbonate (VEC), and 4-ethynyl-1,3-dioxolan-2-one (EEC) are exemplified; and one or more selected from ethylene carbonate, propylene carbonate, 4-fluoro-1,3-dioxolan-2-one, vinylene carbonate, and 4-ethynyl-1,3-dioxolan-2-one (EEC) are more suitable.

Use of at least one of the aforementioned cyclic carbonates having an unsaturated bond, such as a carbon-carbon double bond, a carbon-carbon triple bond, etc., or a fluorine atom is preferred because a low-temperature load characteristic after high-temperature charging storage is much more improved; and it is more preferred to contain both a cyclic carbonate containing an unsaturated bond, such as a carbon-carbon double bond, a carbon-carbon triple bond, etc., and a cyclic carbonate having a fluorine atom.

As the cyclic carbonate having an unsaturated bond, such as a carbon-carbon double bond, a carbon-carbon triple bond, etc., VC, VEC, or EEC is more preferred; and as the cyclic carbonate having a fluorine atom, FEC or DFEC is more preferred.

A content of the cyclic carbonate having an unsaturated bond, such as a carbon-carbon double bond, a carbon-carbon triple bond, etc., is preferably 0.07% by volume or more, more preferably 0.2% by volume or more, and still more preferably 0.7% by volume or more relative to a total volume of the nonaqueous solvent; and when an upper limit thereof is preferably 7% by volume or less, more preferably 4% by volume or less, and still more preferably 2.5% by volume or less, stability of a surface film at the time of high-temperature storage may be much more increased without impairing Li ion permeability at low temperatures, and hence, such is preferred.

A content of the cyclic carbonate having a fluorine atom is preferably 0.07% by volume or more, more preferably 4% by volume or more, and still more preferably 7% by volume or more relative to a total volume of the nonaqueous solvent; and when an upper limit thereof is preferably 35% by volume or less, more preferably 25% by volume or less, and still more preferably 15% by volume or less, stability of a surface film at the time of high-temperature storage may be much more increased without impairing Li ion permeability at low temperatures, and hence, such is preferred.

In the case where the nonaqueous solvent contains both a cyclic carbonate having an unsaturated bond, such as a carbon-carbon double bond, a carbon-carbon triple bond, etc., and a cyclic carbonate having a fluorine atom, a content of the cyclic carbonate having an unsaturated bond, such as a carbon-carbon double bond, a carbon-carbon triple bond, etc., is preferably 0.2% by volume or more, more preferably 3% by volume or more, and still more preferably 7% by volume or more relative to a content of the cyclic carbonate having a fluorine atom; and when an upper limit thereof is preferably 40% by volume or less, more preferably 30% by volume or less, and still more preferably 15% by volume or less, stability of a surface film at the time of high-temperature storage may be much more increased without impairing Li ion permeability at low temperatures, and hence, such is especially preferred.

When the nonaqueous solvent contains ethylene carbonate, propylene carbonate, or both ethylene carbonate and propylene carbonate, resistance of a surface film formed on an electrode becomes small, and hence, such is preferred. A content of ethylene carbonate, propylene carbonate, or both ethylene carbonate and propylene carbonate is preferably 3% by volume or more, more preferably 5% by volume or more, and still more preferably 7% by volume or more relative to a total volume of the nonaqueous solvent; and an upper limit thereof is preferably 45% by volume or less, more preferably 35% by volume or less, and still more preferably 25% by volume or less.

These solvents may be used solely; and in the case where a combination of two or more of the solvents is used, the electrochemical characteristics are more improved in a broad temperature range, and hence, such is preferred, and use of a combination of three or more thereof is especially preferred. As suitable combinations of these cyclic carbonates, EC and PC; EC and VC; PC and VC; VC and FEC; EC and FEC; PC and FEC; FEC and DFEC; EC and DFEC; PC and DFEC; VC and DFEC; VEC and DFEC; VC and EEC; EC and EEC; EC, PC and VC; EC, PC and FEC; EC, VC and FEC; EC, VC and VEC; EC, VC and EEC; EC, EEC and FEC; PC, VC and FEC; EC, VC and DFEC; PC, VC and DFEC; EC, PC, VC and FEC; EC, PC, VC and DFEC; etc. are preferred. Among the aforementioned combinations, combinations, such as EC and VC; EC and FEC; PC and FEC; EC, PC and VC; EC, PC and FEC; EC, VC and FEC; EC, VC and EEC; EC, EEC and FEC; PC, VC and FEC; EC, PC, VC and FEC; etc., are more preferred.

As the linear ester, there are suitably exemplified asymmetric linear carbonates, such as methyl ethyl carbonate (MEC), methyl propyl carbonate (MPC), methyl isopropyl carbonate (MIPC), methyl butyl carbonate, ethyl propyl carbonate, etc.; symmetric linear carbonates, such as, dimethyl carbonate (DMC), diethyl carbonate (DEC), dipropyl carbonate, dibutyl carbonate, etc.; and linear carboxylic acid esters, such as pivalic acid esters, such as methyl pivalate, ethyl pivalate, propyl pivalate, etc., methyl propionate, ethyl propionate, methyl acetate, ethyl acetate, etc.

In the case of using a negative electrode in which a charging potential in a fully-charged state is less than 1 V on the Li basis, among the aforementioned linear esters, linear esters having a methyl group, which are selected from dimethyl carbonate, methyl ethyl carbonate, methyl propyl carbonate, methyl isopropyl carbonate, methyl butyl carbonate, methyl propionate, methyl acetate, and ethyl acetate are preferred, and linear carbonates having a methyl group are especially preferred. This is because decomposition in the negative electrode hardly proceeds, so that deterioration of the capacity may be suppressed.

In the case of using a linear carbonate having a methyl group, it is preferred to use two or more kinds thereof. Furthermore, it is more preferred that both a symmetric linear carbonate and an asymmetric linear carbonate are contained, and it is still more preferred that a content of the symmetric linear carbonate is more than that of the asymmetric linear carbonate.

Although a content of the linear ester is not particularly limited, it is preferred to use the linear ester in an amount in the range of from 60 to 90% by volume relative to a total volume of the nonaqueous solvent. When the content is 60% by volume or more, an effect for decreasing the viscosity of the nonaqueous electrolytic solution is thoroughly obtained, whereas when it is 90% by volume or less, an electroconductivity of the nonaqueous electrolytic solution thoroughly increases, whereby the electrochemical characteristics in a broad temperature range are improved, and therefore, it is preferred that the content of the linear ester falls within the aforementioned range.

In the case of using a linear carbonate, it is preferred to use two or more kinds thereof. Furthermore, it is more preferred that both a symmetric linear carbonate and an asymmetric linear carbonate are contained, and it is still more preferred that a content of the symmetric linear carbonate is more than that of the asymmetric linear carbonate.

A proportion of the volume of the symmetric linear carbonate occupying in the linear carbonate is preferably 51% by volume or more, and more preferably 55% by volume or more. An upper limit thereof is more preferably 95% by volume or less, and still more preferably 85% by volume or less. It is especially preferred that dimethyl carbonate is contained as the symmetric linear carbonate. It is more preferred that the asymmetric linear carbonate has a methyl group, and methyl ethyl carbonate is especially preferred.

The aforementioned case is preferred because the high-temperature cycle property is improved.

As for a proportion of the cyclic carbonate and the linear ester, from the viewpoint of improving the electrochemical characteristics in a broad temperature range, a ratio of the cyclic carbonate to the linear ester (volume ratio) is preferably from 10/90 to 45/55, more preferably from 15/85 to 40/60, and still more preferably from 20/80 to 35/65.

As other nonaqueous solvents, there are suitably exemplified one or more selected from cyclic ethers, such as tetrahydrofuran, 2-methyltetrahydrofuran, 1,3-dioxolane, 1,4-dioxane, etc.; linear ethers, such as 1,2-dimethoxyethane, 1,2-diethoxyethane, 1,2-dibutoxyethane, etc.; amides, such as dimethylformamide, etc.; sulfones, such as sulfolane, etc.; and lactones, such as γ-butyrolactone, γ-valerolactone, α-angelicalactone, etc.

[Electrolyte Salt]

As the electrolyte salt which is used in the present invention, there are suitably exemplified the following lithium salts.

(Lithium Salt)

As the electrolyte salt which is used in the present invention, there are suitably exemplified the following lithium salts.

As the lithium salt, there are suitably exemplified inorganic lithium salts, such as $LiPF_6$, $LiPO_2F_2$, $Li_2PO_3F$, $LiBF_4$, $LiClO_4$, $LiSO_3F$, etc.; linear fluoroalkyl group-containing lithium salts, such as $LiN(SO_2F)_2$, $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, etc.; cyclic fluoroalkylene chain-containing lithium salts, such as $(CF_2)_2(SO_2)_2NLi$, $(CF_2)_3(SO_2)_2NLi$, etc.; and lithium salts having an oxalate complex as an anion, such as lithium bis[oxalate-O,O']borate (LiBOB), lithium difluoro[oxalate-O,O']borate, lithium difluorobis[oxalate-O,O']phosphate (LiPFO), lithium tetrafluoro[oxalate-O,O']phosphate, etc.; and these may be used solely or in admixture of two or more kinds thereof.

Of those, one or more selected from $LiPF_6$, $LiBF_4$, $LiPO_2F_2$, $Li_2PO_3F$, $LiSO_3F$, $LiN(SO_2F)_2$, $LiN(SO_2CF_3)_2$, $LiN(SO_2C_2F_5)_2$, lithium bis[oxalate-O,O']borate (LiBOB), lithium difluorobis[oxalate-O,O']phosphate (LiPFO), and lithium tetrafluoro[oxalate-O,O']phosphate are preferred; and one or more selected from $LiPF_6$, $LiBF_4$, $LiPO_2F_2$, $LiSO_3F$, $LiN(SO_2CF_3)_2$, $LiN(SO_2F)_2$, lithium bis[oxalate-O,O']borate, and lithium difluorobis[oxalate-O,O']phosphate (LiPFO) are more preferred.

In general, a concentration of the lithium salt is preferably 0.3 M or more, more preferably 0.7 M or more, and still more preferably 1.1 M or more relative to the aforementioned nonaqueous solvent. An upper limit thereof is preferably 2.5 M or less, more preferably 2.0 M or less, and still more preferably 1.6 M or less.

[Production of Nonaqueous Electrolytic Solution]

The nonaqueous electrolytic solution of the present invention may be, for example, obtained by mixing the aforementioned nonaqueous solvent and adding 1,3-dioxane and at least one selected from the phosphoric acid ester compound represented by the general formula (I), the cyclic sulfonic acid ester compound represented by the general formula (II), and the cyclic acid anhydride containing a side chain having allyl hydrogen to the aforementioned electrolyte salt and the nonaqueous electrolytic solution.

At this time, the nonaqueous solvent used and the compounds added to the nonaqueous electrolytic solution are preferably purified previously to reduce as much as possible the content of impurities, in such an extent that does not extremely deteriorate the productivity.

The nonaqueous electrolytic solution of the present invention may be used in first and second energy storage devices shown below, in which the nonaqueous electrolyte may be used not only in the form of a liquid but also in the form of gel. Furthermore, the nonaqueous electrolytic solution of the present invention may also be used for a solid polymer electrolyte.

Among these, the nonaqueous electrolytic solution is preferably used in the first energy storage device using a lithium salt as the electrolyte salt (i.e., for a lithium battery) or in the second energy storage device (i.e., for a lithium ion capacitor), more preferably used in a lithium battery, and most suitably used in a lithium secondary battery.

[First Energy Storage Device (Lithium Battery)]

The lithium battery of the present invention is a generic name for a lithium primary battery and a lithium secondary battery. In the present specification, the term, lithium secondary battery, is used as a concept that includes a so-called lithium ion secondary battery. The lithium battery of the present invention contains a positive electrode, a negative electrode, and the aforementioned nonaqueous electrolytic solution having an electrolyte salt dissolved in a nonaqueous solvent. Other constitutional members used than the nonaqueous electrolytic solution, such as the positive electrode, the negative electrode, etc., are not particularly limited.

For example, as the positive electrode active material for lithium secondary batteries, usable is a complex metal oxide of lithium and one or more selected from cobalt, manganese, and nickel. These positive electrode active materials may be used solely or in combination of two or more kinds thereof.

The lithium complex metal oxide includes, for example, one or more selected from $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, and $LiCo_{0.98}Mg_{0.02}O_2$. These materials may be used as a combination, such as a combination of $LiCoO_2$ and $LiMn_2O_4$, a combination of $LiCoO_2$ and $LiNiO_2$, and a combination of $LiMn_2O_4$ and $LiNiO_2$.

For improving the safety on overcharging and the cycle property, and for enabling the use at a charge potential of 4.3 V or more, a part of the lithium complex metal oxide may be substituted with other elements. For example, a part of cobalt, manganese, or nickel may be substituted with at least one or more elements of Sn, Mg, Fe, Ti, Al, Zr, Cr, V, Ga, Zn, Cu, Bi, Mo, La, etc.; or a part of O may be substituted with S or F; or the oxide may be coated with a compound containing any of such other elements.

Of those, preferred are lithium complex metal oxides, such as $LiCoO_2$, $LiMn_2O_4$, and $LiNiO_2$, with which the charge potential of the positive electrode in a fully-charged state may be used at 4.3 V or more based on Li; and more preferred are lithium complex metal oxides, such as solid solutions of $LiCo_{1-x}M_xO_2$ (wherein M is one or more elements selected from Sn, Mg, Fe, Ti, Al, Zr, Cr, V, Ga, Zn, and Cu; 0.001≤x≤0.05), $LiCo_{1/3}N_{1/3}Mn_{1/3}O_2$, $LiNi_{0.5}Mn_{0.3}CO_{0.2}O_2$, $LiNi_{0.85}CO_{0.10}Al_{0.05}O_2$, $LiNi_{1/2}Mn_{3/2}O_4$, $Li_2MnO_3$, and $LiMO_2$ (wherein M is a transition metal, such as Co, Ni, Mn, Fe, etc.) that may be used at 4.4 V or more. The use of the lithium complex metal oxide capable of acting at a high charge voltage may worsen the electrochemical characteristics particularly on using in a broad temperature range due to the reaction with the electrolytic solution on charging, but in the lithium secondary battery of the present invention, the electrochemical characteristics may be prevented from worsening.

Furthermore, a lithium-containing olivine-type phosphate may also be used as the positive electrode active material. Especially preferred are lithium-containing olivine-type phosphates containing one or more selected from iron, cobalt, nickel, and manganese. Specific examples thereof include $LiFePO_4$, $LiCoPO_4$, $LiNiPO_4$, and $LiMnPO_4$.

These lithium-containing olivine-type phosphates may be partly substituted with any other element; and for example, a part of iron, cobalt, nickel, or manganese therein may be substituted with one or more elements selected from Co, Mn, Ni, Mg, Al, B, Ti, V, Nb, Cu, Zn, Mo, Ca, Sr, W, and Zr; or the phosphates may be coated with a compound containing any of these other elements or with a carbon material. Among those, $LiFePO_4$ or $LiMnPO_4$ is preferred.

The lithium-containing olivine-type phosphate may be used, for example, in combination with the aforementioned positive electrode active material.

For the positive electrode for lithium primary batteries, there are exemplified oxides or chalcogen compounds of one or more metal elements, such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, CoO, etc.; sulfur compounds, such as $SO_2$, $SOCl_2$, etc.; and carbon fluorides (graphite fluoride) represented by a general formula $(CF_x)_n$. Above all, $MnO_2$, $V_2O_5$, or graphite fluoride is preferred.

An electroconductive agent of the positive electrode is not particularly limited so long as it is an electron-conductive material that does not undergo a chemical change. Examples thereof include graphites, such as natural graphite (e.g., flaky graphite, etc.), artificial graphite, etc.; and one or more carbon blacks selected from acetylene black, Ketjen black, channel black, furnace black, lamp black, and thermal black. Graphite and carbon black may be properly mixed and used. An addition amount of the electroconductive agent to the positive electrode mixture is preferably from 1 to 10% by mass, and especially preferably from 2 to 5% by mass.

The positive electrode may be produced by mixing the aforementioned positive electrode active material with an electroconductive agent, such as acetylene black, carbon black, etc., and a binder, such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), an ethylene-propylene-diene terpolymer, etc., adding a high-boiling point solvent, such as 1-methyl-2-pyrrolidone, etc., thereto, followed by kneading to prepare a positive electrode mixture, applying this positive electrode mixture onto a collector, such as an aluminum foil, a stainless steel-made lathplate, etc., and drying and shaping the resultant under pressure, followed by a heat treatment in vacuum at a temperature of from about 50° C. to 250° C. for about 2 hours.

A density of a portion of the positive electrode except for the collector is generally 1.5 $g/cm^3$ or more, and for the purpose of further increasing the capacity of the battery, the density is preferably 2 $g/cm^3$ or more, more preferably 3 $g/cm^3$ or more, and still more preferably 3.6 $g/cm^3$ or more. An upper limit thereof is preferably 4 $g/cm^3$ or less.

As the negative electrode active material for lithium secondary batteries, one or more selected from a lithium metal, lithium alloys, or carbon materials capable of absorbing and releasing lithium [e.g., graphitizable carbon, non-graphitizable carbon having a spacing of the (002) plane of 0.37 nm or more, graphite having a spacing of the (002) plane of 0.34 nm or less, etc.], tin (elemental substance), tin compounds, silicon (elemental substance), silicon compounds, and lithium titanate compounds, such as $Li_4Ti_5O_{12}$, etc., may be used.

Of those, in absorbing and releasing ability of a lithium ion, it is more preferred to use a high-crystalline carbon material, such as artificial graphite, natural graphite, etc.; and it is especially preferred to use a carbon material having a graphite-type crystal structure in which a lattice (002) spacing ($d_{002}$) is 0.340 nm (nanometers) or less, especially from 0.335 to 0.337 nm.

By using an artificial graphite particle having a bulky structure in which plural flat graphite fine particles are mutually gathered or bound in non-parallel, or a graphite particle prepared by subjecting a flaky natural graphite particle to a spheroidizing treatment by repeatedly giving a mechanical action, such as compression force, frictional force, shear force, etc., when a ratio [I(110)/I(004)] of a peak intensity I(110) of the (110) plane to a peak intensity I(004) of the (004) plane, which is obtained from the X-ray diffraction measurement of a negative electrode sheet at the time of shaping under pressure of a portion of the negative electrode except for the collector in a density of 1.5 $g/cm^3$ or more, is 0.01 or more, the electrochemical characteristics in a much broader temperature range are improved, and hence, such is preferable; and the peak intensity ratio

[I(110)/I(004)] is more preferably 0.05 or more, and still more preferably 0.1 or more. When excessively treated, there may be the case where the crystallinity is worsened, and the discharge capacity of the battery is worsened, and therefore, an upper limit of the peak intensity ratio [I(110)/I(004)] is preferably 0.5 or less, and more preferably 0.3 or less.

When the high-crystalline carbon material (core material) is coated with a carbon material that is more low-crystalline than the core material, the electrochemical characteristics in a broad temperature range become much more favorable, and hence, such is preferable. The crystallinity of the carbon material of the coating may be confirmed by TEM.

When the high-crystalline carbon material is used, there is a tendency that it reacts with the nonaqueous electrolytic solution on charging, thereby worsening the electrochemical characteristics at low temperatures or high temperatures due to an increase of the interfacial resistance; however, in the lithium secondary battery according to the present invention, the electrochemical characteristics in a broad temperature range become favorable.

The metal compound capable of absorbing and releasing lithium, serving as a negative electrode active material, includes compounds containing at least one metal element, such as of Si, Ge, Sn, Pb, P, Sb, Bi, Al, Ga, In, Ti, Mn, Fe, Co, Ni, Cu, Zn, Ag, Mg, Sr, Ba, etc.

The metal compound may be in any form including an elemental substance, an alloy, an oxide, a nitride, a sulfide, a boride, and an alloy with lithium, and any of an elemental substance, an alloy, an oxide, and an alloy with lithium is preferred since the battery capacity may be increased thereby.

Above all, more preferred are those containing at least one element selected from Si, Ge, and Sn, and especially preferred are those containing at least one element selected from Si and Sn, as capable of increasing the battery capacity.

The negative electrode may be formed in such a manner that the same electroconductive agent, binder, and high-boiling point solvent as in the formation of the aforementioned positive electrode are used and kneaded to provide a negative electrode mixture, and the negative electrode mixture is then applied onto a collector, such as a copper foil, dried, shaped under pressure, and then heat-treated in vacuum at a temperature of approximately from 50 to 250° C. for approximately 2 hours.

A density of the part except for the collector of the negative electrode is generally 1.1 g/cm$^3$ or more, and for further increasing the battery capacity, the density is preferably 1.5 g/cm$^3$ or more, and especially preferably 1.7 g/cm$^3$ or more. An upper limit thereof is preferably 2 g/cm$^3$ or less.

Examples of the negative electrode active material for a lithium primary battery include a lithium metal and a lithium alloy.

The structure of the lithium battery is not particularly limited, and may be a coin-type battery, a cylinder-type battery, a prismatic battery, a laminate-type battery, or the like, each having a single-layered or multi-layered separator.

Although the separator for the battery is not particularly limited, a single-layered or laminated micro-porous film of a polyolefin, such as polypropylene, polyethylene, etc., as well as a woven fabric, a nonwoven fabric, etc. may be used.

The lithium secondary battery of the present invention has excellent electrochemical characteristics in a broad temperature range even when the final charging voltage is 4.2 V or more, and particularly 4.3 V or more, and furthermore, the characteristics thereof are still good even at 4.4 V or more.

Although the final discharging voltage may be generally 2.8 V or more, and further 2.5 V or more, the final discharging voltage of the lithium secondary battery of the present invention may be 2.0 V or more. Although a current value is not specifically limited, in general, the battery is used within the range of from 0.1 to 30 C.

The lithium battery of the present invention may be charged/discharged at from −40 to 100° C., and preferably at from −10 to 80° C.

In the present invention, as a countermeasure against an increase in the internal pressure of the lithium battery, such a method may be employed that a safety valve is provided in the battery cap, and a cutout is provided in the battery component, such as a battery can, a gasket, etc. As a safety countermeasure for preventing overcharging, a current cut-off mechanism capable of detecting an internal pressure of the battery to cut off the current may be provided in a battery cap.

[Second Energy Storage Device (Lithium Ion Capacitor)]

This energy storage device is an energy storage device that stores energy by utilizing intercalation of a lithium ion into a carbon material, such as graphite, etc., as the negative electrode. This energy storage device may also be referred to as a lithium ion capacitor (LIC). Examples of the positive electrode include one utilizing an electric double layer between an active carbon electrode and an electrolytic solution therein, and one utilizing doping/dedoping reaction of a π-conjugated polymer electrode.

The electrolytic solution contains at least a lithium salt, such as LiPF$_6$, etc.

EXAMPLES

Examples I-1 to I-23 and Comparative Examples I-1 to I-3

[Production of Lithium Ion Secondary Battery]

94% by mass of LiCoO$_2$ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by punching out in a prescribed size, thereby producing a positive electrode sheet. A density of a portion of the positive electrode except for the collector was 3.6 g/cm$^3$.

95% by mass of artificial graphite (d$_{002}$=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by punching out in a prescribed size, thereby producing a negative electrode sheet. A density of a portion of the negative electrode except for the collector was 1.5 g/cm$^3$. This electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

The above-obtained positive electrode sheet, a micro-porous polyethylene film-made separator, and the above-obtained negative electrode sheet were laminated in this order, and a nonaqueous electrolytic solution having a composition shown in each of Tables 1 and 2 was added thereto, thereby producing a laminate-type battery.

[Evaluation of High-Temperature Cycle Property]

In a thermostatic chamber at 60° C., the battery produced by the above-described method was treated by repeating a cycle of charging up to a final voltage of 4.3 V with a constant current of 1 C and under a constant voltage for 3 hours and subsequently discharging down to a discharge voltage of 3.0 V with a constant current of 1 C, until it reached 100 cycles. Then, a discharge capacity retention rate after 100 cycles at 60° C. was determined according to the following equation.

Discharge capacity retention rate (%)=(Discharge capacity after 100 cycles at 60° C.)/(Discharge capacity after 1st cycle)×100

<Evaluation of Gas Generation Amount After 100 Cycles>

A gas generation amount after 100 cycles was measured by the Archimedean method. As for the gas generation amount, a relative gas generation amount was examined on the basis of defining the gas generation amount of Comparative Example 1 as 100%.

<Initial Negative Electrode Thickness>

The battery after the 1st cycle by the aforementioned method was disassembled, and an initial negative electrode thickness was measured.

<Negative Electrode Thickness After Cycles>

The battery after 100 cycles at 60° C. by the aforementioned method was disassembled, and a negative electrode thickness after high-temperature cycles was measured.

<Increase Rate in Negative Electrode Thickness>

An increase rate in negative electrode thickness was determined according to the following equation.

Increase rate in negative electrode thickness (%)=[{(Negative electrode thickness after 100 cycles at 60° C.)−(Initial negative electrode thickness)}/(Initial negative electrode thickness)]×100

Production conditions of battery and battery characteristics are shown in Table 1.

TABLE 1

| | Composition of electrolyte salt Composition of nonaqueous electrolytic solution (Volume ratio of solvent) | Addition amount of 1,3-dioxane (content in nonaqueous electrolytic solution) (% by mass) | Compound of general formula (I) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example I-1 | 1.3M LiPF6 EC/DMC/MEC (30/55/15) | 1 | (structure shown) | 1 | 72 | 7 |
| Example I-2 | 1.3M LiPF6 EC/VC/DMC/MEC (29/1/55/15) | 1 | | 0.05 | 72 | 9 |
| Example I-3 | 1.3M LiPF6 EC/VC/DMC/MEC (29/1/55/15) | 1 | | 1 | 74 | 6 |
| Example I-4 | 1.3M LiPF6 EC/VC/DMC/MEC (29/1/55/15) | 1 | | 3 | 72 | 7 |
| Example I-5 | 1.3M LiPF6 EC/VC/DMC/MEC (29/1/55/15) | 0.05 | | 1 | 71 | 9 |
| Example I-6 | 1.3M LiPF6 EC/VC/DMC/MEC (29/1/55/15) | 3 | | 1 | 72 | 7 |
| Example I-7 | 1.3M LiPF6 EC/VC/FEC/DMC/MEC (24/1/5/55/15) | 1 | | 1 | 78 | 6 |
| Example I-8 | 1.3M LiPF6 EC/EEC/FEC/DMC/MEC (24/1/5/55/15) | 1 | | 1 | 79 | 5 |
| Example I-9 | 1.3M LiPF6 EC/VC/DMC/MEC (29/1/55/15) | 1 | (structure shown with F) | 0.05 | 74 | 8 |
| Example I-10 | 1.3M LiPF6 EC/VC/DMC/MEC (29/1/55/15) | 1 | | 1 | 76 | 5 |
| Example I-11 | 1.3M LiPF6 EC/VC/DMC/MEC (29/1/55/15) | 1 | | 3 | 73 | 6 |
| Example I-12 | 1.3M LiPF6 EC/VC/DMC/MEC (29/1/55/15) | 0.05 | | 1 | 74 | 8 |
| Example I-13 | 1.3M LiPF6 EC/VC/DMC/MEC (29/1/55/15) | 3 | | 1 | 73 | 6 |
| Example I-14 | 1.3M LiPF6 EC/VC/PC/DMC/MEC (19/1/10/55/15) | 1 | | 1 | 79 | 5 |

TABLE 1-continued

| Composition of electrolyte salt Composition of nonaqueous electrolytic solution (Volume ratio of solvent) | Addition amount of 1,3-dioxane (content in nonaqueous electrolytic solution) (% by mass) | Compound of general formula (I) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|
| Example I-15 | 1.3M LiPF6 EC/VC/DMC/MEC (29/1/55/15) | 1 | 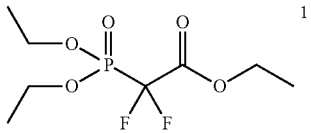 | 1 | 78 | 6 |

TABLE 2

| | Composition of electrolyte salt Composition of nonaqueous electrolytic solution (Volume ratio of solvent) | Addition amount of 1,3-dioxane (content in nonaqueous electrolytic solution) (% by mass) | Compound of general formula (I) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example I-16 | 1.3M LiPF6 EC/VC/DMC/MEC (29/1/55/15) | 1 | 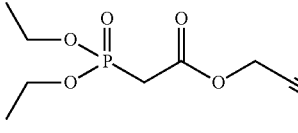 | 0.05 | 75 | 8 |
| Example I-17 | 1.3M LiPF6 EC/VC/DMC/MEC (29/1/55/15) | 1 | | 1 | 81 | 4 |
| Example I-18 | 1.3M LiPF6 EC/VC/DMC/MEC (29/1/55/15) | 1 | | 3 | 77 | 5 |
| Example I-19 | 1.3M LiPF6 EC/VC/DMC/MEC (29/1/55/15) | 0.05 | | 1 | 79 | 7 |
| Example I-20 | 1.3M LiPF6 EC/VC/DMC/MEC (29/1/55/15) | 3 | | 1 | 76 | 7 |
| Example I-21 | 1.3M LiPF6 EC/VC/DMC/MEC (29/1/55/15) | 1 | 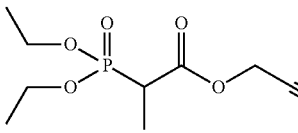 | 1 | 80 | 4 |
| Example I-22 | 1.3M LiPF6 EC/VC/DMC/MEC (29/1/55/15) | 1 | 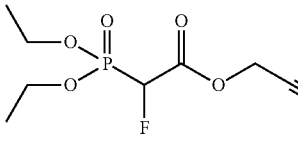 | 1 | 83 | 2 |
| Example I-23 | 1.3M LiPF6 EC/VC/DMC/MEC (29/1/55/15) | 1 | 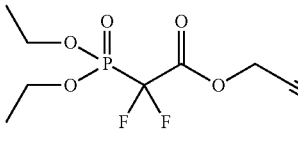 | 1 | 85 | 3 |
| Comparative Example I-1 | 1.3M LiPF6 EC/VC/DMC/MEC (29/1/55/15) | — | None | — | 67 | 12 |
| Comparative Example I-2 | 1.3M LiPF6 EC/VC/DMC/MEC (29/1/55/15) | 1 | None | — | 69 | 11 |

TABLE 2-continued

| | Composition of electrolyte salt Composition of nonaqueous electrolytic solution (Volume ratio of solvent) | Addition amount of 1,3-dioxane (content in nonaqueous electrolytic solution) (% by mass) | Compound of general formula (I) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Comparative Example I-3 | 1.3M LiPF6 EC/VC/DMC/MEC (29/1/55/15) | 0 |  | 1 | 66 | 13 |

Examples I-24 and I-25 and Comparative Example I-4

Negative electrode sheets were produced by using silicon (elemental substance) (negative electrode active material) in place of the negative electrode active materials used in Example I-2 and Comparative Example I-2, respectively. 40% by mass of silicon (elemental substance), 50% by mass of artificial graphite ($d_{002}$=0.335 nm, negative electrode active material), and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste.

Laminate-type batteries were produced in the same manner as in Example I-2 and Comparative Example I-2, respectively, except that this negative electrode mixture paste was applied onto one surface of a copper foil (collector), dried, and treated under pressure, followed by punching out in a prescribed size, thereby producing a negative electrode sheet, and the batteries were evaluated. The results are shown in Table 3.

Examples I-26 and I-27 and Comparative Example I-5

Positive electrode sheets were produced by using LiFePO$_4$ (positive electrode active material) coated with amorphous carbon in place of the positive electrode active materials used in Example I-2 and Comparative Example I-2, respectively. 90% by mass of LiFePO$_4$ coated with amorphous carbon and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a positive electrode mixture paste.

Laminate-type batteries were produced in the same manner as in Example I-2 and Comparative Example I-2, respectively, except that this positive electrode mixture paste was applied onto one surface of an aluminum foil (collector), dried, and treated under pressure, followed by punching out in a prescribed size, thereby producing a positive electrode sheet; and that in evaluating the battery, the final charging voltage and the final discharging voltage were set to 3.6 V and 2.0 V, respectively, and the batteries were evaluated.

TABLE 3

| | Composition of electrolyte salt Composition of nonaqueous electrolytic solution (Volume ratio of solvent) | Addition amount of 1,3-dioxane (content in nonaqueous electrolytic solution) (% by mass) | Compound of general formula (I) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example I-24 | 1.3M LiPF6 EC/VC/DMC/MEC (29/1/55/15) | 1 | (ethyl diethylphosphonoacetate structure) | 1 | 70 | 15 |
| Example I-25 | 1.3M LiPF6 EC/VC/DMC/MEC (29/1/55/15) | 1 | (propargyl diethylphosphonoacetate structure) | 1 | 74 | 12 |
| Comparative Example I-4 | 1.3M LiPF6 EC/VC/DMC/MEC (29/1/55/15) | 1 | None | — | 52 | 85 |

The results are shown in Table 4.

TABLE 4

| | Composition of electrolyte salt Composition of nonaqueous electrolytic solution (Volume ratio of solvent) | Addition amount of 1,3-dioxane (content in nonaqueous electrolytic solution) (% by mass) | Compound of general formula (I) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example I-26 | 1.3M LiPF6 EC/VC/DMC/MEC (29/1/55/15) | 1 | ethyl 2-(diethoxyphosphoryl)acetate (ethyl ester) | 1 | 85 | 4 |
| Example I-27 | 1.3M LiPF6 EC/VC/DMC/MEC (29/1/55/15) | 1 | 2-propynyl 2-(diethoxyphosphoryl)acetate | 1 | 89 | 2 |
| Comparative Example I-5 | 1.3M LiPF6 EC/VC/DMC/MEC (29/1/55/15) | 1 | None | — | 72 | 8 |

In all the lithium secondary batteries of the aforesaid Examples I-1 to I-23, not only the cycle property is improved, but also the increase in negative electrode thickness is suppressed, as compared with the lithium secondary batteries of Comparative Example I-1 in the case of adding neither 1,3-dioxane nor the compound of the general formula (I) according to the present invention in the nonaqueous electrolytic solution, Comparative Example I-2 in the case of adding only 1,3-dioxane in the nonaqueous electrolytic solution, and Comparative Example I-3 of adding only ethyl 2-(diethoxyphosphoryl)acetate in the nonaqueous electrolytic solution.

As a result of measuring the gas generation amount after high-temperature cycles in the lithium secondary batteries produced under the same conditions as in Example I-3, Comparative Example I-1, and Comparative Example I-2, respectively by the Archimedean method, when the gas generation amount of Comparative Example I-1 was defined as 100%, the gas generation amount of Example I-3 and Comparative Example I-2 was 77% and 78%, respectively; and therefore, the suppression of gas generation was equal even by adding the compound of the general formula (I).

From the foregoing, it has been clarified that the advantageous effect of the present invention is a peculiar effect to the case of containing the specified compound of the present invention in the nonaqueous electrolytic solution having an electrolyte salt dissolved in a nonaqueous solvent.

From the comparison between Examples I-24 and I-25 and Comparative Example I-4 as well as the comparison between Examples I-26 and I-27 and Comparative Example I-5, the same effect as in the case of using silicon (elemental substance) for the negative electrode, or in the case of using a lithium-containing olivine-type iron phosphate (LiFePO$_4$) for the positive electrode, is found.

In consequence, it is clear that the advantageous effect of the present invention is not an effect that depends upon a specified positive electrode or negative electrode.

Furthermore, the nonaqueous electrolytic solutions of Examples I-1 to I-27 also have an effect for improving discharging properties of a lithium primary battery in a broad temperature range.

Examples II-1 to II-13 and Comparative Examples II-1 to II-2

[Production of Lithium Ion Secondary Battery]

94% by mass of LiCoO$_2$ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by punching out in a prescribed size, thereby producing a positive electrode sheet. A density of a portion of the positive electrode except for the collector was 3.6 g/cm$^3$.

95% by mass of artificial graphite (d$_{002}$=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by punching out in a prescribed size, thereby producing a negative electrode sheet. A density of a portion of the negative electrode except for the collector was 1.5 g/cm$^3$.

This electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

The above-obtained positive electrode sheet, a microporous polyethylene film-made separator, and the above-obtained negative electrode sheet were laminated in this order, and a nonaqueous electrolytic solution having a composition shown in Table 5 was added thereto, thereby producing a laminate-type battery.

[Evaluation of High-Temperature Cycle Property]

In a thermostatic chamber at 60° C., the battery produced by the above-described method was treated by repeating a cycle of charging up to a final voltage of 4.3 V with a constant current of 1 C and under a constant voltage for 3 hours and subsequently discharging down to a discharge voltage of 3.0 V with a constant current of 1 C, until it reached 100 cycles.

Then, a discharge capacity retention rate after 100 cycles at 60° C. was determined according to the following equation.

Discharge capacity retention rate (%)=(Discharge capacity after 100 cycles at 60° C.)/(Discharge capacity after 1st cycle)×100

<Evaluation of Gas Generation Amount After 100 Cycles>

A gas generation amount after 100 cycles was measured by the Archimedean method. As for the gas generation amount, a relative gas generation amount was examined on the basis of defining the gas generation amount of Comparative Example 1 as 100%.

<Initial Negative Electrode Thickness>

The battery after the 1st cycle by the aforementioned method was disassembled, and an initial negative electrode thickness was measured.

<Negative Electrode Thickness After Cycles>

The battery after 100 cycles at 60° C. by the aforementioned method was disassembled, and a negative electrode thickness after high-temperature cycles was measured.

<Increase Rate in Negative Electrode Thickness>

An increase rate in negative electrode thickness was determined according to the following equation.

Increase rate in negative electrode thickness (%)=[{(Negative electrode thickness after 100 cycles at 60° C.)−(Initial negative electrode thickness)}/(Initial negative electrode thickness)]×100

Production conditions of battery and battery characteristics are shown in Table 5.

TABLE 5

| | Composition of electrolyte salt Composition of nonaqueous electrolytic solution (Volume ratio of solvent) | Addition amount of 1,3-dioxane (content in nonaqueous electrolytic solution) (% by mass) | Compound of general formula (II) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example II-1 | 1.15M LiPF6 EC/DMC/MEC (30/60/10) | 1 | (structure 1) | 1 | 79 | 5 |
| Example II-2 | 1.15M LiPF6 EC/VC/DMC/MEC (29/1/60/10) | 1 | | 0.05 | 75 | 6 |
| Example II-3 | 1.15M LiPF6 EC/VC/DMC/MEC (29/1/60/10) | 1 | | 1 | 81 | 3 |
| Example II-4 | 1.15M LiPF6 EC/VC/DMC/MEC (29/1/60/10) | 1 | | 3 | 79 | 4 |
| Example II-5 | 1.15M LiPF6 EC/VC/DMC/MEC (29/1/60/10) | 0.05 | | 1 | 75 | 5 |
| Example II-6 | 1.15M LiPF6 EC/VC/DMC/MEC (29/1/60/10) | 3 | | 1 | 77 | 4 |
| Example II-7 | 1.15M LiPF6 EC/VC/FEC/DMC/MEC (24/1/5/60/10) | 1 | | 1 | 83 | 2 |
| Example II-8 | 1.15M LiPF6 EC/VC/DMC/MEC (29/1/60/10) | 1 | (structure 2) | 0.05 | 75 | 6 |
| Example II-9 | 1.15M LiPF6 EC/VC/DMC/MEC (29/1/60/10) | 1 | | 1 | 80 | 4 |
| Example II-10 | 1.15M LiPF6 EC/VC/DMC/MEC (29/1/60/10) | 1 | | 3 | 80 | 5 |
| Example II-11 | 1.15M LiPF6 EC/VC/DMC/MEC (29/1/60/10) | 0.05 | | 1 | 75 | 4 |
| Example II-12 | 1.15M LiPF6 EC/VC/DMC/MEC (29/1/60/10) | 3 | | 1 | 77 | 5 |
| Example II-13 | 1.15M LiPF6 EC/EEC/FEC/DMC/MEC (24/1/5/60/10) | 1 | | 1 | 85 | 3 |

TABLE 5-continued

|  | Composition of electrolyte salt Composition of nonaqueous electrolytic solution (Volume ratio of solvent) | Addition amount of 1,3-dioxane (content in nonaqueous electrolytic solution) (% by mass) | Compound of general formula (II) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Comparative Example II-1 | 1.15M LiPF6 EC/VC/DMC/MEC (29/1/60/10) | — | None | — | 65 | 12 |
| Comparative Example II-2 | 1.15M LiPF6 EC/VC/DMC/MEC (29/1/60/10) | 1 | None | — | 69 | 11 |

Example II-14 and Comparative Example II-3

Negative electrode sheets were produced by using silicon (elemental substance) (negative electrode active material) in place of the negative electrode active materials used in Example II-2 and Comparative Example II-2, respectively. 40% by mass of silicon (elemental substance), 50% by mass of artificial graphite ($d_{002}$=0.335 nm, negative electrode active material), and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. Laminate-type batteries were produced in the same manner as in Example II-2 and Comparative Example II-2, respectively, except that this negative electrode mixture paste was applied onto one surface of a copper foil (collector), dried, and treated under pressure, followed by punching out in a prescribed size, thereby producing a negative electrode sheet, and the batteries were evaluated. The results are shown in Table 6.

Example II-15 and Comparative Example II-4

Positive electrode sheets were produced by using LiFePO$_4$ (positive electrode active material) coated with amorphous carbon in place of the positive electrode active materials used in Example II-2 and Comparative Example II-2, respectively. 90% by mass of LiFePO$_4$ coated with amorphous carbon and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a positive electrode mixture paste.

Laminate-type batteries were produced in the same manner as in Example II-2 and Comparative Example II-2, respectively, except that this positive electrode mixture paste was applied onto one surface of an aluminum foil (collector), dried, and treated under pressure, followed by punching out in a prescribed size, thereby producing a positive electrode sheet; and that in evaluating the battery, the final charging voltage and the final discharging voltage were set to 3.6 V and 2.0 V, respectively, and the batteries were evaluated. The results are shown in Table 7.

TABLE 6

|  | Composition of electrolyte salt Composition of nonaqueous electrolytic solution (Volume ratio of solvent) | Addition amount of 1,3-dioxane (content in nonaqueous electrolytic solution) (% by mass) | Compound of general formula (II) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example II-14 | 1.15M LiPF6 EC/DMC/MEC (30/60/10) | 1 | 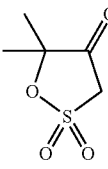 | 1 | 73 | 12 |
| Comparative Example II-3 | 1.15M LiPF6 EC/DMC/MEC (30/60/10) | 1 | None | — | 56 | 83 |

TABLE 7

| | Composition of electrolyte salt Composition of nonaqueous electrolytic solution (Volume ratio of solvent) | Addition amount of 1,3-dioxane (content in nonaqueous electrolytic solution) (% by mass) | Compound of general formula (II) | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example II-15 | 1.15M LiPF6 EC/DMC/MEC (30/60/10) | 1 | (structure: tetrahydrofuran-sulfone ester) | 1 | 89 | 2 |
| Comparative Example II-4 | 1.15M LiPF6 EC/DMC/MEC (30/60/10) | 1 | None | — | 72 | 8 |

In all the lithium secondary batteries of the aforesaid Examples II-1 to II-13, not only the cycle property is improved, but also the increase in negative electrode thickness is suppressed, as compared with the lithium secondary batteries of Comparative Example II-1 in the case of adding neither 1,3-dioxane nor the compound of the general formula (II) according to the present invention in the nonaqueous electrolytic solution and Comparative Example II-2 in the case of adding only 1,3-dioxane in the nonaqueous electrolytic solution.

As a result of measuring the gas generation amount after high-temperature cycles in the lithium secondary batteries produced under the same conditions as in Example II-3, Example II-9, Comparative Example II-1, and Comparative Example II-2, respectively by the Archimedean method, when the gas generation amount of Comparative Example II-1 was defined as 100%, the gas generation amount of Example II-3, Example II-9, and Comparative Example II-2 was 80%, 79% and 81%, respectively; and therefore, the suppression of gas generation was equal even by adding the compound of the general formula (II).

From the foregoing, it has been clarified that the effect of the present invention for decreasing the rate of increase in an electrode thickness is a peculiar effect to the case of containing the specified compound of the present invention in the nonaqueous electrolytic solution having an electrolyte salt dissolved in a nonaqueous solvent.

From the comparison between Example II-14 and Comparative Example II-3 as well as the comparison between Example II-15 and Comparative Example II-4, the same effect as in the case of using silicon (elemental substance) for the negative electrode, or in the case of using a lithium-containing olivine-type iron phosphate (LiFePO$_4$) for the positive electrode, is found. In consequence, it is clear that the advantageous effect of the present invention is not an effect that depends upon a specified positive electrode or negative electrode.

Furthermore, the nonaqueous electrolytic solutions of Examples II-1 to II-15 also have an effect for improving discharging properties of a lithium primary battery in a broad temperature range.

Examples III-1 to III-8

[Production of Lithium Ion Secondary Battery]

A positive electrode sheet and a negative electrode sheet were produced in the same manner as in Example I-1; the positive electrode sheet, a micro-porous polyethylene film-made separator, and the negative electrode sheet were laminated in this order; and a nonaqueous electrolytic solution having a composition shown in Table 8 was added thereto, thereby producing a laminate-type battery.

A high-temperature cycle property was evaluated in the same manner as in Example I-1.

Production conditions of battery and battery characteristics are shown in Table 8.

TABLE 8

| | Composition of electrolyte salt Composition of nonaqueous electrolytic solution (Volume ratio of solvent) | Addition amount of 1,3-dioxane (content in nonaqueous electrolytic solution) (% by mass) | Compound to be used in combination with 1,3-dioxane | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example III-1 | 1.3M LiPF6 EC/VC/DMC/MEC (29/1/55/15) | 1 | (allyl-substituted γ-butyrolactone) | 0.05 | 75 | 5 |
| Example III-2 | 1.3M LiPF6 EC/VC/DMC/MEC (29/1/55/15) | 1 | | 0.2 | 78 | 4 |
| Example III-3 | 1.3M LiPF6 EC/VC/DMC/MEC (29/1/55/15) | 1 | | 0.5 | 80 | 6 |

TABLE 8-continued

| | Composition of electrolyte salt Composition of nonaqueous electrolytic solution (Volume ratio of solvent) | Addition amount of 1,3-dioxane (content in nonaqueous electrolytic solution) (% by mass) | Compound to be used in combination with 1,3-dioxane | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|
| Example III-4 | 1.3M LiPF6 EC/VC/DMC/MEC (29/1/55/15) | 1 | | 1 | 77 | 7 |
| Example III-5 | 1.3M LiPF6 EC/VC/DMC/MEC (29/1/55/15) | 0.05 | | 1 | 76 | 7 |
| Example III-6 | 1.3M LiPF6 EC/VC/DMC/MEC (29/1/55/15) | 3 | | 0.2 | 76 | 5 |
| Example III-7 | 1.3M LiPF6 EC/VC/DMC/MEC (29/1/55/15) | 1 | (allyl succinic anhydride) + (diethyl (propargyloxycarbonylmethyl)phosphonate) | 0.5 + 0.5 | 83 | 4 |
| Example III-8 | 1.3M LiPF6 + 0.05M LiPFO EC/VC/DMC/MEC (29/1/55/15) | 1 | (allyl succinic anhydride) | 0.5 | 82 | 3 |

In all the lithium secondary batteries of the aforesaid Examples III-1 to III-8, not only the cycle property is improved, but also the increase in negative electrode thickness is suppressed, as compared with the lithium secondary batteries of Comparative Example I-1 in the case of adding neither 1,3-dioxane nor the compound to be used in combination with 1,3-dioxane according to the present invention and Comparative Example I-2 in the case of adding only 1,3-dioxane.

As a result of measuring the gas generation amount after high-temperature cycles in the lithium secondary batteries produced under the same conditions as in Example III-2, Comparative Example I-1, and Comparative Example I-2, respectively by the Archimedean method, when the gas generation amount of Comparative Example I-1 was defined as 100%, the gas generation amount of Example III-2 and Comparative Example I-2 was 76% and 78%, respectively; and therefore, the suppression of gas generation was equal even by adding the compound to be used in combination with 1,3-dioxane.

From the foregoing, it has been clarified that the advantageous effect of the present invention is a peculiar effect to the case of containing the specified compound of the present invention in the nonaqueous electrolytic solution having an electrolyte salt dissolved in a nonaqueous solvent.

Furthermore, the nonaqueous electrolytic solutions of Examples III-1 to III-8 also have an effect for improving discharging properties of a lithium primary battery in a broad temperature range.

INDUSTRIAL APPLICABILITY

The energy storage device using the nonaqueous electrolytic solution of the present invention is useful as an energy storage device, such as a lithium secondary battery having excellent electrochemical characteristics in a broad temperature range, etc.

The invention claimed is:

1. A nonaqueous electrolytic solution, comprising:
(i) an electrolyte salt dissolved in a nonaqueous solvent comprising a cyclic carbonate and a linear ester; and
(ii) additives comprising:
from 0.001 to 5% by mass of 1,3-dioxane; and
from 0.001 to 5% by mass of a phosphoric acid ester compound represented by formula (I):

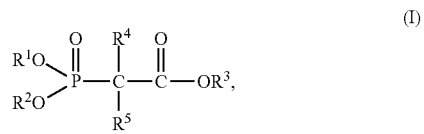

wherein:
- each of $R^1$ and $R^2$ independently represents an alkyl group having from 1 to 6 carbon atoms or a halogenated alkyl group having from 1 to 6 carbon atoms, in which at least one hydrogen atom is substituted with a halogen atom;
- $R^3$ represents an alkynyl group having from 3 to 6 carbon atoms; and
- each of $R^4$ and $R^5$ independently represents a hydrogen atom, a halogen atom, or an alkyl group having from 1 to 4 carbon atoms.

2. The nonaqueous electrolytic solution according to claim 1, comprising the phosphoric acid ester compound represented by formula (I), wherein the phosphoric acid ester compound represented by formula (I) is at least one selected from the group consisting of methyl 2-(diethoxyphosphoryl)acetate, 2-propynyl 2-(dimethoxyphosphoryl)acetate, 2-propynyl 2-(diethoxyphosphoryl)acetate, 2-propynyl 2-(diethoxyphosphoryl)acetate, 2-propynyl 2-(diethoxyphosphoryl)acetate, 2-propynyl 2-(diethoxyphosphoryl)propanoate, 2-proynyl 2-(dimethoxyphosphoryl)propanoate, methyl 2-(diethoxyphosphoryl)-2-fluoroacetate, ethyl 2-(diethoxyphosphoryl)-2-fluoroacete, 2-propenyl 2-(diethoxyphosphoryl)-2-fluoroacetate, 2-propynyl 2-(diethoxyphosphoryl)-2-fluoroacetate, methyl 2(diethoxyphosphoryl)-2,2-difluoroncetate, ethyl 2-(diethoxyphosphoryl)-2,2-difluoroacetate, 2-propenyl 2-diethoxyphosphoryl-2,2-difluoroacetate, and 2-propynyl 2-(diethoxyphosphoryl)-2,2-difluoroacetate.

3. The nonaqueous electrolytic solution according to claim 1, wherein the cyclic carbonate is one or more selected from the group consisting of ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate, and 4-ethynyl-1,3-dioxolan-2-one.

4. The nonaqueous electrolytic solution according to claim 1, wherein the linear ester is one or more selected from the group consisting of methyl ethyl carbonate, methyl propyl carbonate, methyl isopropyl carbonate, methyl butyl carbonate, ethyl propyl carbonate, dimethyl carbonate, diethyl carbonate, dipropyl carbonate, dibutyl carbonate, and a linear carboxylic acid ester.

5. The nonaqueous electrolytic solution accord to claim 1, wherein the electrolyte salt comprises at least one lithium salt selected from the group consisting of $LiPF_6$, $LiBF_4$, $LiPO_2F_2$, $Li_2PO_3F$, $LiN(SO_3F)_2$, $LiN(SO_2CF_3)_2$, $Lin(SO_2C_2F_5)_2$, lithium bis[oxalate-O,O']borate, difluorobis[oxalate-O,O']phosphate, and lithium tetrafluoro[oxalate-O,O']phosphate.

6. The nonaqueous electrolytic solution according to claim 5, wherein a concentration of the lithium salt is from 0.3 to 2.5 M relative to the nonaqueous solvent.

7. An energy storage device, comprising:
- a positive electrode;
- a negative electrode: and
- the nonaqueous electrolytic solution according to claim 1.

8. The energy storage device according to claim 7, comprising a positive electrode active material which is a complex metal oxide of lithium comprising one or more selected from the group consisting of cobalt, manganese, and nickel, or a lithium-containing olivine-type phosphate comprising one or more selected from the group consisting of iron, cobalt, nickel, and manganese.

9. The energy storage device according to claim 8, comprising a negative electrode active material comprising one or more selected from the group consisting of a lithium metal, a lithium alloy, a carbon material capable of absorbing and releasing lithium, a tin compound, silicon, a silicon compound, and a lithium titanate compound.

10. The energy storage device according to claim 7, comprising a negative electrode active material comprising one or more selected from the group consisting of a lithium metal, a lithium alloy, a carbon material capable of absorbing and releasing lithium, tin, a tin compound, silicon, a silicon compound, and a lithium titanate compound.

* * * * *